United States Patent

[11] 3,600,006

[72] Inventor John Greenwood Slaven
17 Queen Victoria Avenue, Toronto 6, Ontario, Canada
[21] Appl. No. 832,726
[22] Filed June 12, 1969
[45] Patented Aug. 17, 1971
[32] Priority June 12, 1968
[33] Great Britain
[31] 27,858/68

[54] COUPLINGS FOR TRAILERS
4 Claims, 4 Drawing Figs.
[52] U.S. Cl. .................................................. 280/434
[51] Int. Cl. ................................................. B62d 53/08
[50] Field of Search ........................................... 280/434

[56] References Cited
UNITED STATES PATENTS

| | | | |
|---|---|---|---|
| 2,426,002 | 8/1947 | Den Besten | 280/434 |
| 2,838,326 | 6/1958 | Georgi | 280/434 |
| 2,861,818 | 11/1958 | Kayler | 280/434 |
| 2,885,222 | 5/1959 | Walther | 280/436 |
| 3,318,616 | 5/1967 | Fontaine et al. | 280/434 |

Primary Examiner—Leo Friaglia
Attorney—Watson, Cole, Grindle & Watson

ABSTRACT: A coupling for mounting on one vehicle for receiving the coupling pin of another vehicle, the coupling including a hook which is pivotally mounted on one side of an entrance slot in the coupling through which the coupling pin will pass and a locking member which is held in a withdrawn position to one side of the entrance slot by a separate latch member the locking member is arranged to move into an engaged position in which it holds the hook firmly around the pin which has passed through the entrance slot when a pin moves into the entrance slot and rotates the hook. The rotation of the hook moves the latch and releases the locking member which moves under the action of a bias into the locking position.

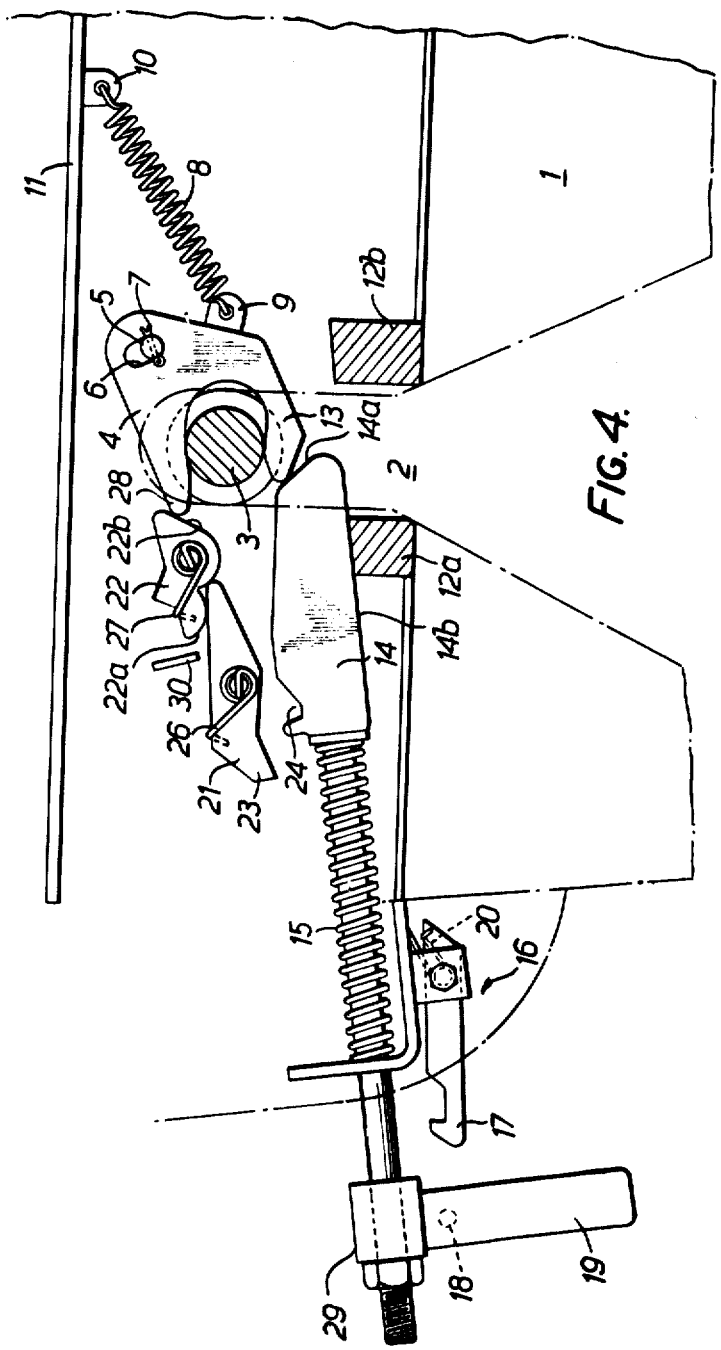

COUPLINGS FOR TRAILERS

This invention relates to couplings for mounting on one vehicle for cooperation with a coupling pin on another vehicle. The invention particularly, although not exclusively, relates to couplings for use between tractors and semitrailers and of the kind known as fifth wheel couplers.

It has previously been proposed in British Pat. No. 983,568 to provide such a coupling with a hook pivotally mounted adjacent an entrance slot in a plate and arranged to rotate when the pin enters the entrance slot and a locking member movable from a withdrawn position to a locked position, the locking member being biased towards the locked position where the locking member holds the hook around a pin which has passed through the entrance slot. In the above specification it has been proposed to hold the locking member in the withdrawn position by means of one limb of the hook so that when a pin enters the entrance slot the hook is rotated and so releases the bolt which then moves under its bias into the locking position around the pin.

Several disadvantages have been found with such a system. The hook and the locking member have to be manufactured to precise measurements with very small tolerances and if the limb of the hook does not hold the locking member in precisely the right position the bias on the locking member will rotate the hook which will then release the locking member which will move into the locked position. The locking member will then have to be manually released before another vehicle can be coupled to the vehicle carrying the coupler and thus a considerably amount of time will be wasted by the driver of the vehicle. There is also a risk of the hook and locking member jamming.

Furthermore, if the hook and the locking member are not exactly the right shape the hook will release the locking member too soon, i.e. before the pin has properly entered the entrance slot and thus the coupling will be unsafe as the driver of the vehicle may not notice that the coupling is not correctly coupled and may drive away. If the driver does notice he will have to dismount from the cab of his vehicle and manually release the coupling and recouple his vehicle, again wasting a considerable amount of time.

According to the present invention, a coupler includes a separate latch member arranged to hold the locking member in the withdrawn position and arranged to be moved by rotation of the hook to release the locking member.

The coupling of the present invention overcomes the disadvantages of the coupling discussed above in that the locking member and the hook do not have to be manufactured very precisely in order to ensure that the locking member is retained by the latch member in the withdrawn position. As the rotation of the hook releases the latch member which in turn releases the locking member the surface of the hook member can be modified very easily, if necessary, to ensure that the latch member is not released until the pin is well within the entrance slot. The driver of the vehicle is therefore certain that the towing vehicle is coupled to the vehicle to be towed merely by moving the towing vehicle relative to the vehicle to be towed so that the pin enters the entrance slot. The only manual adjustment necessary by the driver of the cab is when the vehicle is to be uncoupled when he must release a further latch which is arranged to hold the locking member firmly in position while the two vehicles are coupled together.

The invention may be carried into practice in various ways and one fifth wheel coupler embodying the invention will be described by way of example, with reference to the accompanying drawings, in which:

FIG. 3 is a partial underplan of the coupler showing a kingpin leaving the coupler, and FIG. 4 is a view similar to FIG. 3 showing the kingpin entering the coupler.

Figure 1:
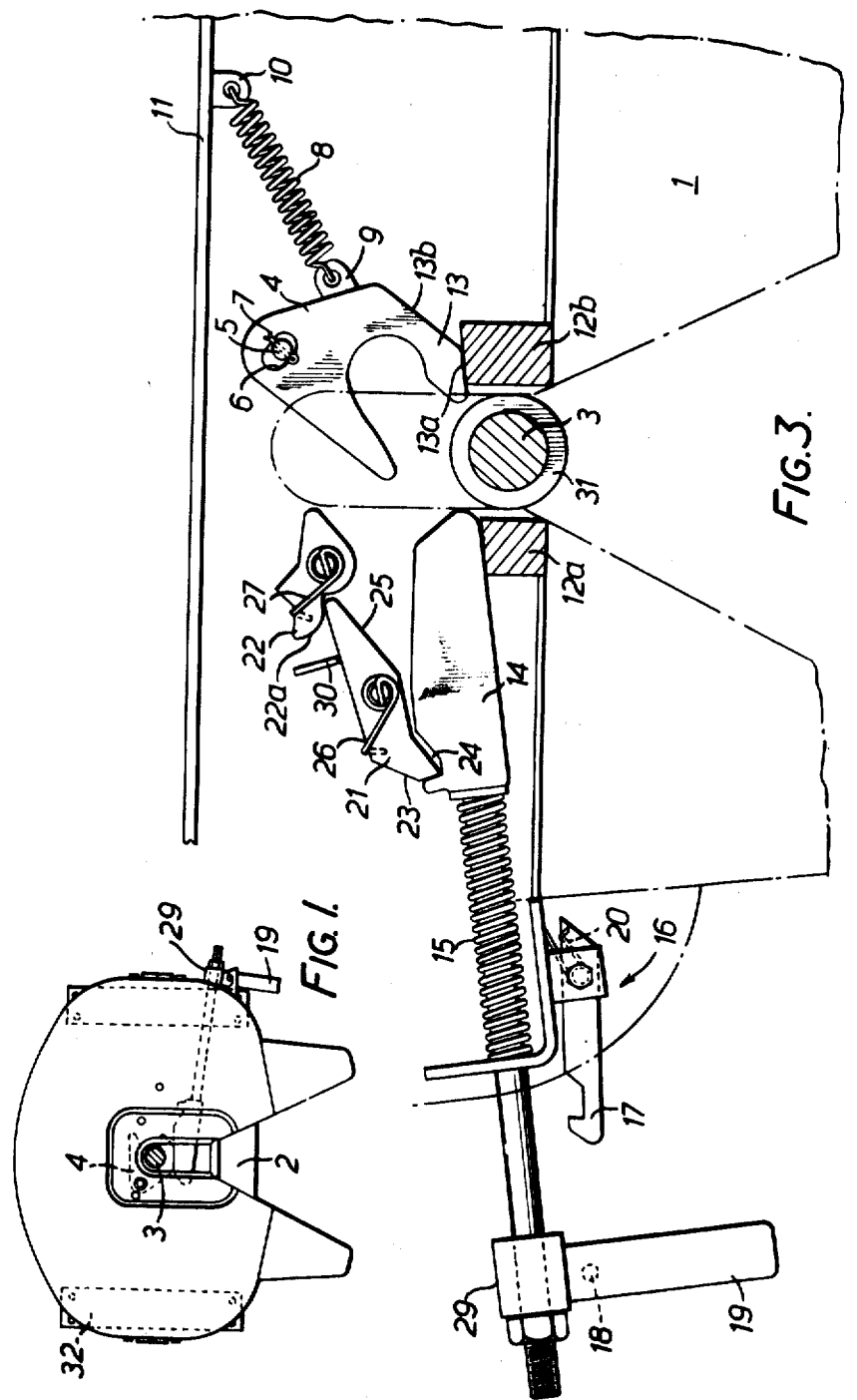
FIG. 1 is a perspective view of the top of a fifth wheel coupler.

The coupler comprises a plate 1 the underside of which carries a number of depending stiffening flanges. The plate has an entrance slot 2 for the kingpin 3 of a trailer which is to be attached to the towing vehicle that carries the fifth wheel coupler, The kingpin 3 of the trailer extends vertically downwards in the normal fashion and thus is able to enter the slot from a position above the plate 1. The slot is open above but is closed below by a plate 33 which is shown partly broken away and which extends rearwardly from the bottom edge of a transverse flange 11 to the bottom ends of two stops 12a and 12b which depend from the plate 1, one of each side of the slot 2.

At the inner end of the slot 2 and slightly to one side is a forked retaining member in the form of a hook 4, which is pivotally mounted to the plate 1 by means of a pin 5 which passes through an elongated slot 6 in the hook and is retained therein by means of a split pin 7. The hook 4 is generally U-shaped so as to accommodate the kingpin, and is biassed from an engaged position shown in FIG. 2 to a release position shown in FIG. 3 in which the two arms of the U extend diagonally across the entrance slot 2 so that the kingpin 3 may pass between the legs of the hook 4.

The hook is biassed towards the release position in the direction of the arrow A by a tension spring 8 which is attached at one end of a lug 9 on the hook, and at the other end to a lug 10, which is attached to a flange 11 depending from the plate 1. The movement of the hook 4 towards the release position is limited by the stop member 12b against which a surface 13a adjacent one end of the arm 13 of the hook abuts.

The hook 4 is arranged to be locked in the engaged position by a locking member which takes the form of a bolt 14. The bolt is mounted on the side of the slot remote from the hook 3 and is moveable across the slot between the plate 1 and the plate 33 from a release position seen in FIG. 3 to an engaged position seen in FIG. 2 in which the tapered head of the bolt engages the outer edge 13b of the arm 13 of the hook. The bolt is urged towards the engaged position in the direction of the arrow B by means of a spring 15 and a latch mechanism shown generally by the reference numeral 16 serves to retain the bolt in the engaged position. The latch mechanism consists of a hook 17 mounted on the plate 1 and arranged to engage a pin 18, which is provided on a handle 19 of the bolt 14. The hook 17 is urged by a spring 20 in the direction of the arrow C into engagement with the pin 18.

The bolt 14 is held in the release position by a two-armed latch member 21 and a trip lever 22. One arm 23 of the two-armed latch member engages a detent 24 in the head of the bolt 14, when the bolt is in the release position and the other arm 25 of the latch member 21 engages a camming surface 22a on the trip lever 22. The latch member is pivotally mounted on the plate 1 and is biassed in the direction of the arm D towards the bolt 14 by a spring 26. The trip lever 22 is also pivotably mounted to the plate 1 and is biassed by a spring 27 in the direction of the arrow E so as to tend to turn the latch member 21 out of the engaging position but is too weak to overcome the biassing force of the spring 26. A stop member 30 is provided on the plate 1 to limit the movement of the latch member 21 in the direction of the arrow D.

When a trailer is to be coupled to the fifth wheel coupler the bolt 14 is moved by the handle 19 into the release position and the trailer moved towards the coupler until the kingpin is in the position shown in FIG. 3. Further movement of the trailer causes the kingpin to move towards the position shown in FIG. 4, and to cause the hook 4 to pivot about the pin 5. Before the kingpin reaches the position shown in FIG. 4,, an arm 28 of the hook strikes a surface 22b on the trip lever 22 causing it to rotate. Rotation of the trip lever causes the cam surface 22a to rotate the armed lever 21 against the action of its biassing spring 26 so that the arm 23 clears the detent 24 to release the bolt 14.

The bolt 14 moves under the action of the spring 15 into the path of the kingpin and a diagonal edge 14a at the forward end of the bolt engages the surface 13a on the arm 13 of the hook, while the longitudinal edge 14b engages the stop member 12a. Further movement of the hook and the bolt brings the surface 13b of the hook into engagement with a surface 14c on the bolt and the surface 14b of the bolt moves into engagement with the stop member 12b until the positions are as shown in FIG. 2.

Figure 2:
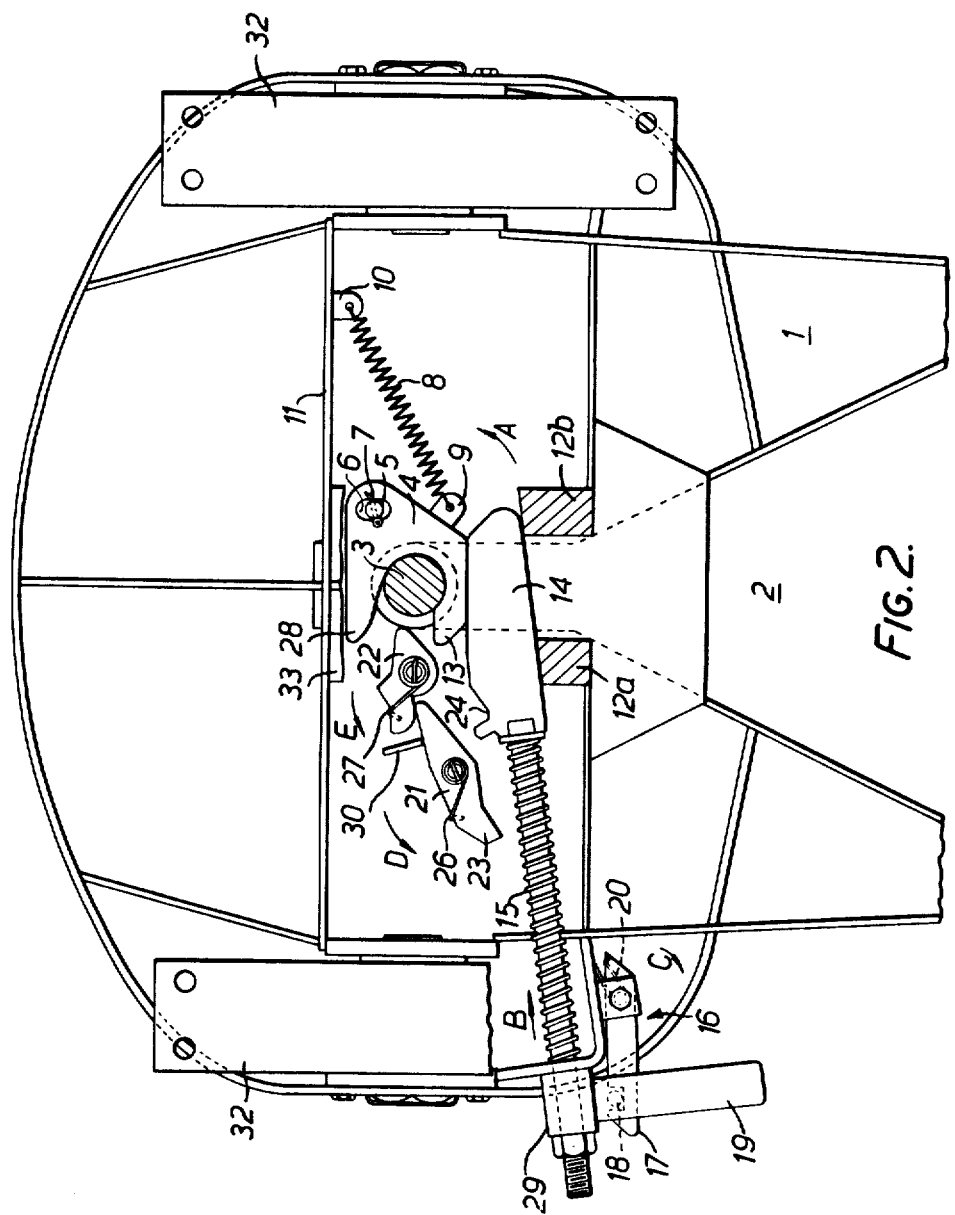
FIG. 2 is an underplan of the coupler with a kingpin in the coupled position.

The position taken up by the bolt when in the locking position shown in FIG. 2 may be adjusted slightly in order to ensure that the kingpin, the hook, the bolt and the stop members 12a and 12b fit tightly together. This adjustment may be carried out by means of an adjusting nut 29 on a screw-threaded portion of the bolt 14 adjacent the handle 19. The end of the bolt projects from the coupling laterally so that it is readily accessible for adjustment purposes.

When the trailer is to be uncoupled the latch mechanism 16 is manually released against the force of the spring 20 and the handle 19 is used to move the bolt towards the release position. In this position the arm 23 of the latch member automatically engages the detent 24 in the head of the bolt.

The plate 1 is rigidly secured to the towing vehicle by means of trunnions and brackets shown generally at 32.

What I claim as my invention and desire to secure by Letters Patent is:

1. A coupler for mounting on one vehicle for cooperation with a coupling pin on another vehicle, the coupler having a slot to receive the pin, a forked retaining member mounted on a pivot to one side of the slot and having a first limb to be engaged by the leading side of the pin and to produce rotation of the retaining member about the pivot on travel of the pin into the slot and a second limb arranged to be moved behind the pin on said rotation, a reciprocatable bolt member movable between a withdrawn position clear of the path of the slot and a locking position engaging the outer side of the second limb to resist rotation of the retaining member in a direction to release the pin and spring biassed towards the locking position, a detent on the bolt member, a latch member biassed towards the bolt member and arranged to engage the detent and maintain the bolt member in the withdrawn position, and trip means arranged to be moved by the first limb on said rotation to release the latch member from the detent.

2. A coupler according to claim 1 wherein said latch member is a two-armed lever one arm of which engages the detent and the trip means are constituted by a two-armed idler lever one arm of which engages the other arm of the latch member and the other arm of which is engaged by the first limb on said rotation.

3. A coupler as claimed in claim 2 wherein the idler lever is biassed in a direction tending to move the latch member out of engagement with the detent, the strength of the bias on the idler lever being less than that on said latch member.

4. A coupler according to claim 1 wherein said latch member is a two-armed lever, one arm of which engages the detent, and the trip means are constituted by a two-armed idler lever, the coupler including biassing means biassing the two-armed idler lever towards the latch member whereby one arm of the idler lever engages the other arm of the latch member and the other arm of the idler lever is engaged by said first limb of said retaining member on said rotation of said retaining member whereby on travel of said pin into the said slot the retaining member rotates the idler lever in one direction to trip the latch member and on travel of said pin out of said slot the rotation of the retaining member rotates the idler lever in the opposite direction to assume a position ready to trip the latch member.